Jan. 22, 1952          H. W. CESAN          2,583,358
GARDEN TRACTOR

Filed Oct. 25, 1949          2 SHEETS—SHEET 1

INVENTOR
*HARRY W. CESAN*
BY *Clapin & Neal*
ATTORNEYS

Jan. 22, 1952     H. W. CESAN     2,583,358
GARDEN TRACTOR
Filed Oct. 25, 1949     2 SHEETS—SHEET 2
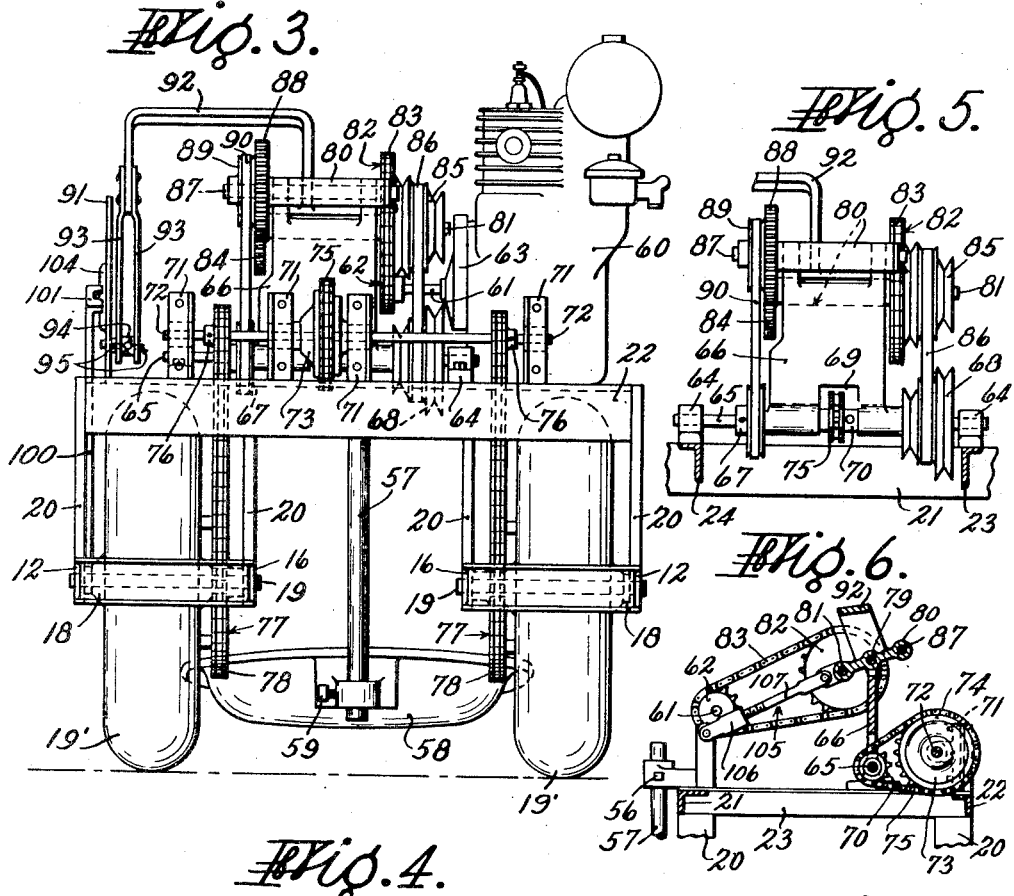
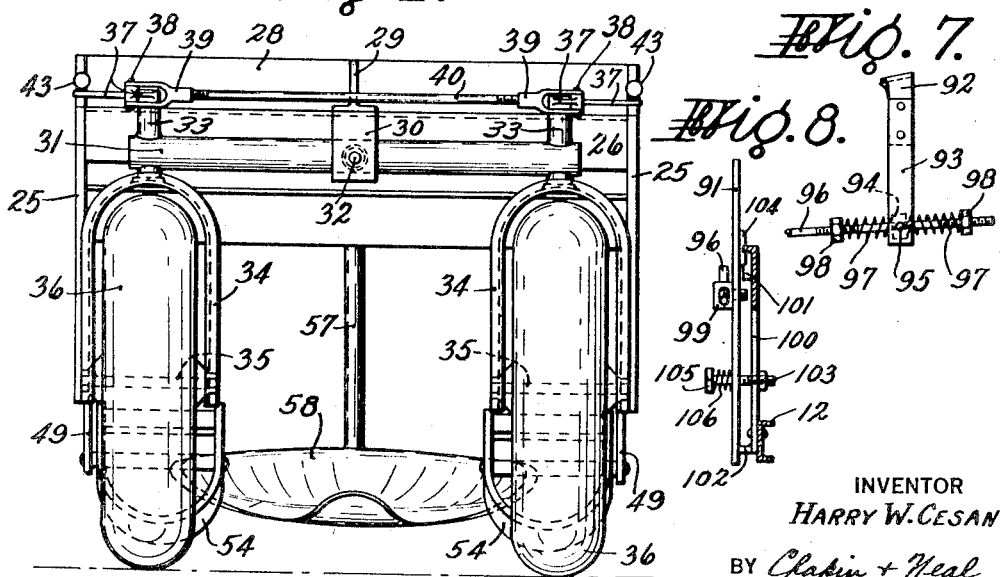
INVENTOR
HARRY W. CESAN
BY Chapin + Neal
ATTORNEYS Patented Jan. 22, 1952

2,583,358

UNITED STATES PATENT OFFICE 2,583,358

GARDEN TRACTOR

Harry W. Cesan, Feeding Hills, Mass.

Application October 25, 1949, Serial No. 123,520

2 Claims. (Cl. 180—1)

This invention relates to garden tractors and particularly to a new tractor vehicle for hand weeding, hand picking and hand transplanting as well as for driving garden plowing and cultivating attachments.

An object of the invention is to provide a power driven vehicle which will leave an operator's hands free for manual garden work and position the operator near enough to the ground for such hand work.

Another object of the invention is to provide a novel driving mechanism which requires only the movement of a single lever to drive the vehicle forward or backward.

A further object of the invention is to provide an economical and useful vehicle of rugged construction for truck garden work.

Other objects and advantages will be apparent from the following description and in the accompanying drawings.

In the drawings:

Fig. 3 is a rear end view of the vehicle shown in Fig. 1 with an engine mounted thereon;

Fig. 4 is a front end view of Fig. 1;

Fig. 5 is a section taken on line 5—5 of Fig. 1;

Fig. 6 is a section taken on line 6—6 of Fig. 1;

Fig. 7 is a fragmentary detail of the clutch shifter mechanism; and

Fig. 8 is a detail view on line 8—8 of Fig. 1.

Figure 2:
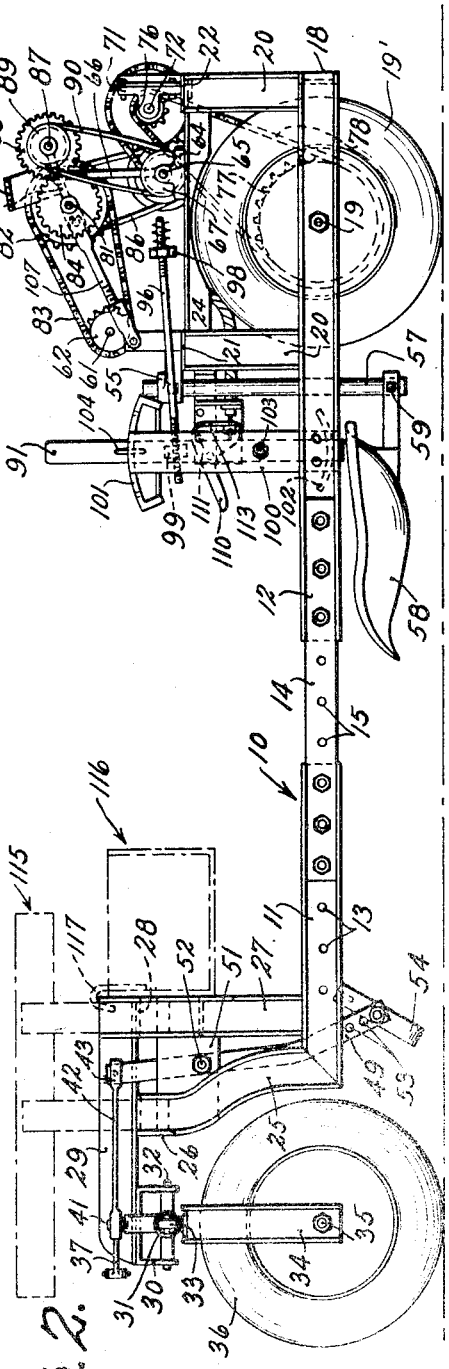
Fig. 2 is a side elevation of Fig. 1 with the shifting lever partly broken away to better show parts behind it.

The new vehicle has an extendable frame generally designated by reference numeral 10 and shown in extended position in Fig. 2.

Frame 10 has laterally spaced longitudinal side channel iron members 11 and 12 each of which contain spaced bolt holes 13. Extension strips 14 with like spaced bolt holes 15 are bolted to members 11 and 12 to hold these members together and for adjustability to different lengths.

Strips 16 (see Fig. 1) are welded at their forward ends to the backs of channel members 12 and extend inwardly and rearwardly of the frame a short length, then rearwardly parallel with side channel members 12. Braces 17 are provided near the bend in strips 16 and connect members 12 and strips 16. Short channel iron struts 18 (see Fig. 3) connect the rear ends of strips 16 with the rear ends of the side channel members 12. Stationary axles 19 are supported between side members 12 and the parallel portions of strips 16, the ends of the axles being fixed thereto. On the axles are mounted the rear traction wheels 19' of the vehicle.

Vertical braces 20 extend upwardly from strips 16 and side members 12 adjacent said wheels and attached at the upper ends of the braces are horizontal drive support angle iron members 21 and 22 running crosswise of the frame. Horizontal bearing support members as angle irons 23 and 24 extend longitudinally of the frame and are fixed between the members 21 and 22.

At the front end of the vehicle, upright channel iron members 25 are fixed at the forward ends of side members 11 and a horizontal angle iron cross piece 26 is fixed between the upper ends of upright members 25. Spaced rearwardly adjacent members 25 are additional vertical supports 27 having a horizontal angle iron member 28 joining their upper ends and extending across the frame parallel to cross piece 26.

Attached to cross members 26 and 28 and centrally thereof is a beam 29 extending longitudinally of the frame with one end forwardly of cross member 26. On the forward end portion of beam 29 is rigidly mounted a downwardly directed bracket 30. A tubular axle 31 is pivotably held in bracket 30 by a pin 32 extending through the sides of the bracket and through the axle 31. Shafts 33 (see Figs. 1 and 4) fixed to front wheel forks 34 extend through tubular axle 31 near its ends. Stationary stub axles 35 are held between the ends of forks 34 with front wheels 36 freely rotatable thereon.

Figure 1:
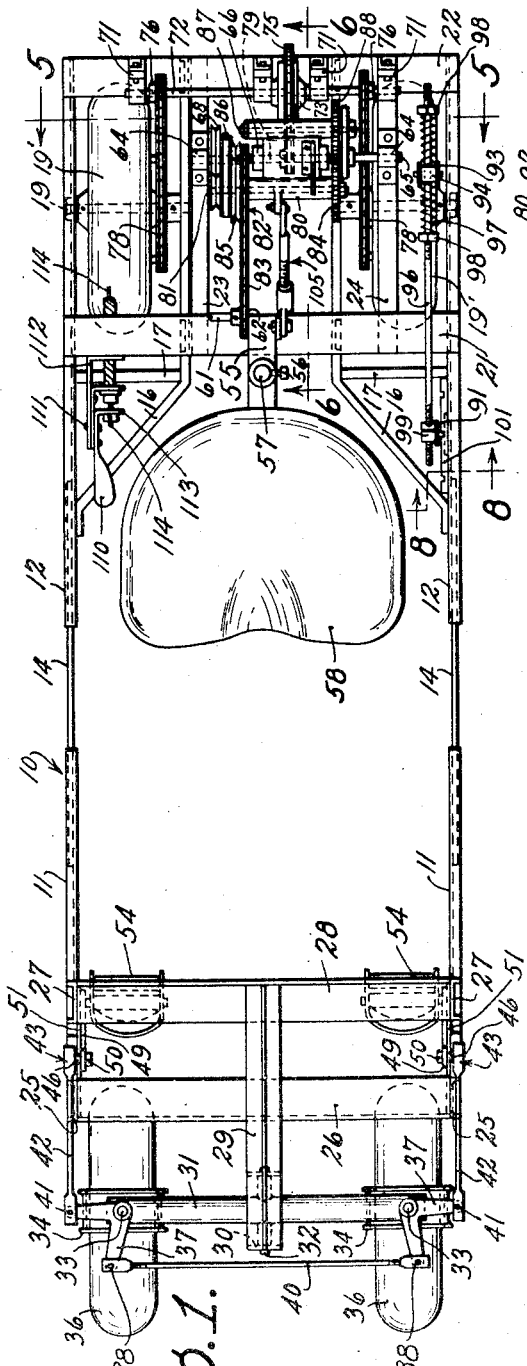
Fig. 1 is a top plan view of a vehicle constructed in accordance with my invention, the engine having been omitted from the view for purposes of clarity.

The steering mechanism for the front wheels 36 is provided in the following manner: Rigidly attached to the upper ends of shafts 33 are bell cranks 37 (Fig. 1). The forwardly extending arm of each bell crank 37 is pivotally connected by a pin 38 (Fig. 4) to one of the two end fittings 39 of a tie rod 40 so that the two front wheels 36 turn in unison.

The ends of the laterally extending arms of bell cranks 37 (Fig. 1) are pivotally connected by pins 41 (Fig. 2) to the forward ends of steering rods 42. At the rear end of steering rods 42 are ball and socket joints 43 of the usual construction. From the ball of the joint an integral stud 46 extends at one side through the casing. The upper ends of two steering levers 49 are securely attached to the studs 46 and held as by nuts 50 on the studs. The ball and socket joints allow full and free pivoting of pipe axle 31 on bracket pin 32.

Between upright members 25 and 27 (Fig. 2) are fixed pivot plates 51 on which the levers 49 are fulcrumed as by pivot pins 52 attached to these plates 51.

The lower end portions of levers 49 carry pedal adjustment holes 53 in which the mounting pins of foot pedals 54 are fixed to the levers 49. Thus the apparatus is steered solely by an operator's feet through the pivoting of the levers 49.

In the rear portion of the frame a seat holding bracket 55 is centrally attached to cross member 21. Adjustably held in bracket 55 as by a set screw 56 is a vertically depending seat adjustment shaft 57. A seat 58 is fixed at the lower end of shaft 57 by a lock bolt 59. By raising or lowering shaft 57 and fixing the same by set screw 56 the operator can raise or lower the seat for any desired height with relation to the ground.

The preferred driving mechanism for the new vehicle will now be described in detail: An engine or motor 60 with shaft 61 (Fig. 3) is mounted on cross members 21 and 22 of the frame. On the end of the shaft 61 a drive sprocket 62 is attached. Motor 60 preferably drives through a gear reduction unit 63 so that shaft 61 may have a relatively low speed.

Mounted on bearing support members 23 and 24 (Fig. 1) are pillow blocks 64 which support a rotatable shaft 65 (see Figs. 3 and 5). Pivotally but not rotatably mounted on shaft 65 is a rocking upright web member 66. A pulley 67 is also pinned on shaft 65 and to one side of member 66 and a stepped pulley sheave 68 is fastened to shaft 65 on the other side of member 66.

A portion of web member 66 is cut away to form an opening 69 in member 66 and, freely rotatable with shaft 65 in this opening, is a differential drive shaft sprocket 70, pinned to shaft 65.

Fixed to the rear cross member 22 (Fig. 3) of the frame are a series of vertically disposed pillow blocks 71 supporting rotatable horizontal shafts 72. The inner ends of shafts 72 are attached to a differential 73 which has a differential driving gear sprocket 74 (Fig. 6). Sprocket 74 is driven through chain 75 by sprocket 70 fixed to shaft 65.

At the outer ends of shafts 72 are wheel driving sprockets 76 (Fig. 3) pinned to the shafts 72 and rotatable with them. Larger sprockets 77 are attached to the inner hubs of the rear wheels and these wheels are driven through chains 78 between wheel sprockets 77 and driving sprockets 76 of shafts 72.

Differential 73 permits either one of the rear wheels to travel faster than the other on turning. It may be of any conventional arrangement as a spider gear differential construction.

The upper end of the pivotal rocking member, web 66, supports a short pintle 79 (see Fig. 6) and on pintle 79 is an H-shaped cross member 80 having elongated bearing sleeves at each outer end. A short rotatable forward drive shaft 81 extends through the sleeve at the forward end of member 80.

Fixed to the end of shaft 81 nearest the motor 60 is a sprocket 82 (Fig. 1) which is driven through a chain 83 by driving sprocket 62 on motor shaft 61 (see Figs. 3 and 6). A gear 84 is pinned to the other end of shaft 81 (see Figs. 1 and 5) for a reverse gear train of the transmission as will be described.

Adjacent driven sprocket 82 on shaft 81 and also fixed on the shaft is a stepped sheave 85 which drives by a belt 86 sheave 68 fixed to shaft 65. Shaft 65 in turn drives shafts 72 through differential 73 and in turn sprockets 76 on shafts 72 drive the rear wheels forward through chains 78 and sprockets 77. Different speeds may be obtained by putting the belt 86 in different steps on the stepped sheaves 68 and 85.

In the sleeve at the rear end of H-shaped member 80 is a short rotatable reverse drive shaft 87 (Figs. 5 and 3) and attached to the end of this shaft 87 furthermost from the motor 60 is a reverse gear 88 (Fig. 2) which meshes with gear 84 pinned to the end of shaft 81. Adjacent reverse gear 88 on shaft 87 is a pulley 89 (Fig. 5) fixed to the shaft 87 so as to revolve with it.

Pulley 89 may drive pulley 67 on shaft 65 when belt 90 between the two pulleys is tightened. When shaft 65 is driven through pulley 67 it rotates in a reverse direction than that which it has when driven through sheave 68. The differential 73 is thus driven in a reverse direction.

When reverse drive belt 90 is tightened, forward drive belt 86 is loosened and vice versa. This is accomplished by the shifting of a single "clutch" lever 91 linked to the H-shaped member 80 on web 66 in a manner now to be described.

Attached rigidly to the H-shaped member 80 is one end of an inverted U-shaped shifting bar 92 (Fig. 3). Fork straps 93 are fastened to the other end of bar 92 and between the lower ends of straps 93 is a small block 94 having trunnions or pins 95 extending through holes in the straps 93.

A shifting rod 96 (Figs. 2 and 8) slidably fits through a central hole in block 94 and springs 97 on the rod 96 abut opposite sides of block 94. The springs 97 are held in abutment by nuts 98 on threaded portions of rod 96. The other end of rod 96 is threaded and held in a threaded bracket 99 on shifting lever 91.

A vertical shifting lever support 100 (Fig. 2) is rigidly attached to side channel frame member 12 and at the upper end of the lever support 100 is an arcuate notched member 101. A similar arcuate member 102 is at the lower end of lever support 100.

Shifting lever 91 is mounted on and pivots on pin 103 extending through the shifting lever 91 and support 100. On lever 91, adjacent to the arcuate member 101 is a stop projection 104. Pivot pin 103 has a head 105 (Fig. 8), and between the head and the lever 91 is a spring 106 so that lever 91 may be pulled outwardly from support 100 and pivoted to another notch in member 101 to seat stop 104 on release of the lever. Member 101 contains three notches. The middle notch is for the neutral position of the lever. Both forward drive belts 86 and reverse drive belt 90 are loose and out of driving position.

The forward notch is for the forward movement and in this position of the lever the H-shaped member 80 on web 66 is pivoted so as to move forward drive shaft 81 upward and backward to tighten forward drive belt 86 and at the same time lower reverse drive shaft 87 and loosen the reverse drive belt 90.

The rear notch is for a reverse drive, the lever in this position having moved member 80 to loosen drive belt 86 and tighten reverse belt 90.

A chain tightener 105 (Figs. 1 and 6) maintains chain 83 taut between motor shaft sprocket 64 and driven sprocket 82 on shaft 81. The tightener has a threaded socket 106 pivotally attached to frame cross member 21 and a rod member 107 one end of which is threaded and fits into socket 106 and the other end of which is pivotally attached to a bracket of member 80 as shown.

A throttle handle 110 is pivoted at 111 on a bracket 112 fixed to cross member 21. A flange projection 113 on the opposite side of pivot 111 receives an end of a Bowden wire 114. Wire 114 actuates the usual motor throttle, not shown, as will be readily understood.

It will be noted from the relative position of seat 58 on the tractor as shown by the drawings that the trunk of an operator's body will extend higher than the frame structure at the front end. This leaves the operator's arms and hands free to work on either side of the machine, or immediately in front of him on the ground below the tractor. Steering is accomplished by foot pressure on the pedals 54. A tray as indicated at 115 may rest over the front frame to carry tools, supplies, etc., or for carrying a supply of plants for transplanting. It may also be used to store produce being harvested. If desired a tray as at 116 at closer range to the operator may also be provided for the same purposes as by hooking the same by a hanger 117 over cross member 28 as indicated in Fig. 2.

The adjustable seat post 57 may be raised from its position immediately adjacent ground level or even inverted in support 55 to provide a relatively high perch on which to handle tall crops such as corn, tomatoes and vines, or the like. For the relatively higher positions of the seat above the frame structure, the foot pedals shown in the drawings may be provided with extensions from levers 49 so that an operator may easily guide the tractor with his feet.

Cultivators and other attachments for truck garden work may be fixed on the front frame structure of the tractor as cross member 28 and vertical supports 27. This enables an operator to guide the implements closely for work over a row or between rows of planting.

Having disclosed my invention, I claim:

1. In a tractor of the type described having a rear frame and front frame, a pair of laterally spaced wheels supporting each frame, laterally spaced longitudinal side frame members connecting said frames, steering mechanism on said front frame, laterally spaced foot pedal operated members immediately adjacent the rear of said front wheels and secured to said steering mechanism for actuating said mechanism, a seat suspended from said rear frame forwardly thereof between the side frame members and means associated with said seat to secure said seat in vertically adjusted position from a position immediately adjacent ground level to a position elevated above said side frame members, the rear wheel, front wheel and foot pedal at each side of the tractor being in alignment with each other, each of the wheels of said frames having an independent mounting with its corresponding frame, a laterally extending frame portion for each pair of wheels and in elevated position adjacent the top of said wheels respectively and connecting said spaced wheel mountings of each frame, the side frame members and portions of the front and rear frames connected to said side frame members being at a level below the top portions of said wheels, whereby said tractor is adapted to straddle a row of planting with an operator on the seat in lowered position having clear access for manual work at each side, above and on the ground in front of said seat.

2. In a tractor of the type described having a rear frame with laterally spaced wheels and a motor and reversible drive belt mechanism mounted on said rear frame and connected to drive the rear wheels in either direction, a front frame with laterally spaced wheels in alignment with the rear wheels, apparatus mounted on said front frame to steer the front wheels, spaced longitudinally extending side frame members connecting said frames, the said spaced side members including elongated extensions adjustably fixed to said frames, an operator's seat mounted on the rear frame and suspended centrally between said side frame members, means associated with said seat to secure said seat in vertically adjusted position from a position immediately adjacent ground level to an elevated position above said side members, laterally spaced foot pedal members connected to said steering apparatus in spaced relation from said seat and rearwardly adjacent the front wheels and in position for an operator on the seat to manipulate while in normal sitting position, an independent wheel fork mounting for each of said wheels and each of said mountings secured to its adjacent frame and journalling a corresponding one of said wheels, a laterally extending frame portion for each pair of said fork mountings and connecting the upper section of each pair of forks, the portions of said frames joining the said wheel fork portions being in elevated position adjacent the top of said wheels and in position for said wheels and frame structures to straddle a planting row, said elongated side members providing clear access for manual work at each side above and on the ground in front of said seat.

HARRY W. CESAN.

REFERENCES CITED

The following references are of record in the file of this patent:

UNITED STATES PATENTS

| Number | Name | Date |
|---|---|---|
| 613,028 | Duvall | Oct. 25, 1898 |
| 1,582,781 | Prenosil | Apr. 27, 1926 |
| 2,261,354 | Fee | Nov. 4, 1941 |
| 2,378,847 | Harris | June 19, 1945 |
| 2,445,797 | Moore | July 27, 1948 |
| 2,511,940 | Platt et al. | June 20, 1950 |
| 2,514,249 | Madsen | July 4, 1950 |
| 2,520,835 | England | Aug. 29, 1950 |

FOREIGN PATENTS

| Number | Country | Date |
|---|---|---|
| 177,017 | Germany | Oct. 23, 1906 |